United States Patent

Ohtsuka et al.

[11] Patent Number: 5,495,840
[45] Date of Patent: Mar. 5, 1996

[54] FUEL INJECTION TIMING CONTROL DEVICE FOR AN INTERNAL COMBUSTION ENGINE

[75] Inventors: Kaoru Ohtsuka; Mamoru Yoshioka, both of Susono, Japan

[73] Assignee: Toyota Jidosha Kabushiki Kaisha, Japan

[21] Appl. No.: 346,233

[22] Filed: Nov. 22, 1994

[30] Foreign Application Priority Data

Nov. 25, 1993  [JP]  Japan .................................. 5-295216
Feb. 18, 1994  [JP]  Japan .................................. 6-021118

[51] Int. Cl.⁶ .............................................. F02M 51/00
[52] U.S. Cl. .............................................. 123/478
[58] Field of Search ............................ 123/478, 480, 123/489, 491

[56] References Cited

U.S. PATENT DOCUMENTS

| | | | |
|---|---|---|---|
| 4,437,445 | 3/1984 | Takahashi et al. | 123/491 |
| 4,469,072 | 9/1984 | Kobayashi et al. | 123/491 |
| 5,072,711 | 12/1991 | Katayama et al. | 123/480 |
| 5,103,791 | 4/1992 | Tomisawa | 123/489 |
| 5,390,641 | 2/1995 | Yamada et al. | 123/491 |

FOREIGN PATENT DOCUMENTS

| | | | |
|---|---|---|---|
| 60-27760 | 2/1985 | Japan | 123/478 |
| 61-82050 | 5/1986 | Japan | 123/478 |
| 3-23342 | 1/1991 | Japan | 123/478 |
| 5-231222 | 9/1993 | Japan | 123/478 |

*Primary Examiner*—Raymond A. Nelli
*Attorney, Agent, or Firm*—Oliff & Berridge

[57] ABSTRACT

A fuel injection timing control device for an internal combustion engine. The device comprises a fuel injector for injecting fuel into the intake port of an engine cylinder and an fuel injection end-timing control system for controlling the fuel injection end-timing of the fuel injector so as to advance gradually, from a first crank angle in the intake stroke to a second crank angle before the intake stroke, according to the engine operating condition. Accordingly, when the fuel injection timing is changed, the amount of fuel which sticks or adheres in the intake port is gradually increased by a small amount, at each fuel injection, so that the air-fuel ratio of the mixture does not become so lean the drivability of the vehicle is deteriorated.

12 Claims, 8 Drawing Sheets

FUEL INJECTION TIMING CONTROL DEVICE FOR AN INTERNAL COMBUSTION ENGINE

BACKGROUND OF THE INVENTION

1. Field of the Invention

The invention relates to a fuel injection timing control device for an internal combustion engine.

2. Description of the Related Art

Japanese Unexamined patent Publication No. 61-2050 discloses a fuel injection timing control device which starts and ends the fuel injection before the intake valve opens, i.e., before the intake stroke, when the engine has warmed up, and which starts and ends the fuel injection after the intake valve opens, i.e., during the intake stroke, when the engine has not warmed up. Accordingly, during fuel injection when the engine has warmed up, all of the injected fuel impinges onto the inside wall of the intake port so that some of the fuel rebounds therefrom as small droplets. Further, the fuel that adheres to the inside wall vaporizes due to the heat of the wall. As a result, during the intake stroke, the small droplets and the vaporized fuel are mixed adequately with the intake air and thus a good air-fuel mixture can be supplied to the combustion chamber. On the other hand, during fuel injection when the engine has not yet warmed up, the injected fuel is atomized in the intake air and is supplied to the combustion chamber with the intake air. In that manner, most of the fuel injected can be supplied to the combustion chamber without sticking to the inside wall of the intake port. Initially, if the injected fuel sticks to the inside wall of the intake port, the fuel cannot be vaporized because the inside wall is still cold prior to the engine warming up. Thus, the fuel flows into the combustion chamber as liquid fuel so that proper combustion deteriorates.

During fuel injection which starts and ends before the intake stroke, as discussed above, some of the injected fuel sticks to the inside wall of the intake port. Although some of fuel on the inside wall is vaporized during the intake stroke and is supplied to the combustion chamber, the remainder of the fuel that originally stuck to the inside wall remains on the intake port and is not supplied to the combustion chamber. However, some of the fuel which remains on the inside wall of the intake port from the prior fuel injections does vaporize and compensates for the current fuel that does not vaporize so that the required amount of fuel is supplied to the combustion chamber.

Accordingly, the fuel injection which starts and ends before the intake stroke needs a certain amount of fuel stuck or adhered to on the inside wall of the intake port. However, in the above fuel injection timing control device, when the fuel injection starting and ending are changed directly from during the intake stroke to before the intake stroke, that is, going from cold start operation to warm engine operation, the amount of fuel which is stuck or adhered to the inside wall of the intake port is small because the fuel injection has started and ended during the intake stroke so there is little previously adhered fuel to compensate for the currently injected fuel stuck to the intake port that does not vaporize. Thus, the air-fuel ratio of the mixture temporarily becomes very lean and the drivability of the vehicle deteriorates during that period.

SUMMARY OF THE INVENTION

Therefore, an object of the invention is to provide a fuel injection timing control device for an internal combustion engine which is capable of preventing drivability deteriorating when the fuel injection start and end-timing are changed from during the intake stroke to before the intake stroke.

According to the invention there is provided a fuel injection timing control device for an internal combustion engine comprising a fuel injector for injecting fuel into the intake port of an engine cylinder and fuel injection end-timing control means for controlling the fuel injection end-timing of the fuel injector so as to change gradually from occurring at a time of a first crank angle that occurs during the intake stroke to occurring at the time of a second crank angle that is before the intake stroke, in accordance with the engine operating condition. For the sake of brevity, throughout the remainder of the specification the expressions "first crank angle in the intake stroke" and "second crank angle before the intake stroke" will be used.

The invention will be more fully understood from the description of the preferred embodiments of the invention, as set forth below, and with reference to the accompanying drawings.

DESCRIPTION OF THE PREFERRED EMBODIMENTS

Figure 1:
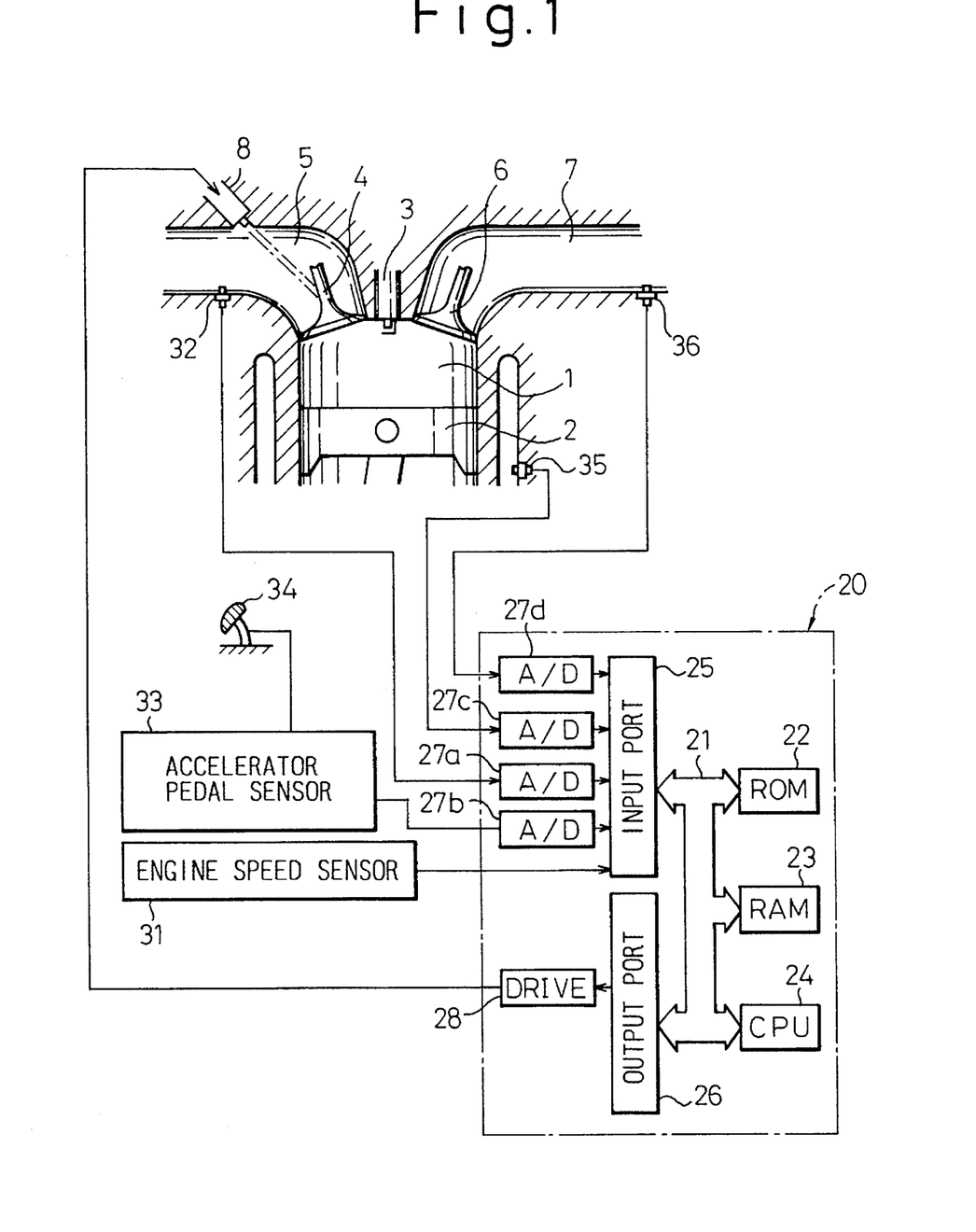
FIG. 1 is a schematic view of an internal combustion engine having a fuel injection timing control device according to the invention.

FIG. 1 is a schematic view of an internal combustion engine having a fuel injection timing control device according to the invention. The figure shows a cylinder of the engine in which reference numeral 1 designates a combustion chamber, reference numeral 2 designates a piston, and reference numeral 3 designates a spark plug. An intake port 5 and an exhaust port 7 are connected to the combustion chamber 1 via an intake valve 4 and an exhaust valve 6, respectively. A fuel injector 8 is arranged in the intake port 5. The injection hole of the fuel injector 8 is directed toward the intake valve 4 when the intake valve is in the closed position.

Reference numeral 20 designates an electronic control unit (ECU) for controlling the fuel injection timing and the amount of fuel injected via the fuel injector 8. The ECU 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected by a bidirectional bus 21.

An engine speed sensor 31, which produces output pulses representing the engine speed, is connected to the input port 25 of the ECU 20. In addition, a pressure sensor 32 is positioned in the intake port 5 downstream of the throttle valve (not shown). The pressure sensor 32 produces an output voltage which is proportional to the negative pressure in the intake port 5 and the output voltage is input into the input port 25 via an A/D converter 27a. An accelerator pedal sensor 33 produces an output voltage which is proportional to the movement of the accelerator pedal 34. The output voltage from the accelerator pedal sensor 33 is input into the input port 25 via an A/D converter 27b. A coolant temperature sensor 35 produces an output voltage which is proportional to the temperature of the cooling water of the engine and which is considered to be the engine temperature. The output voltage of the coolant temperature sensor 35 is input into the input port 25 via an A/D converter 27c. An air-fuel ratio sensor 36 is positioned in the exhaust port 7 and produces an output voltage which is proportional to the air-fuel ratio. The output voltage from the air-fuel ratio sensor 36 is input into the input port 25 via an A/D converter 27d. The output port 26 of the ECU 20 is connected to the fuel injector 8 via a drive circuit 28.

Figure 2:
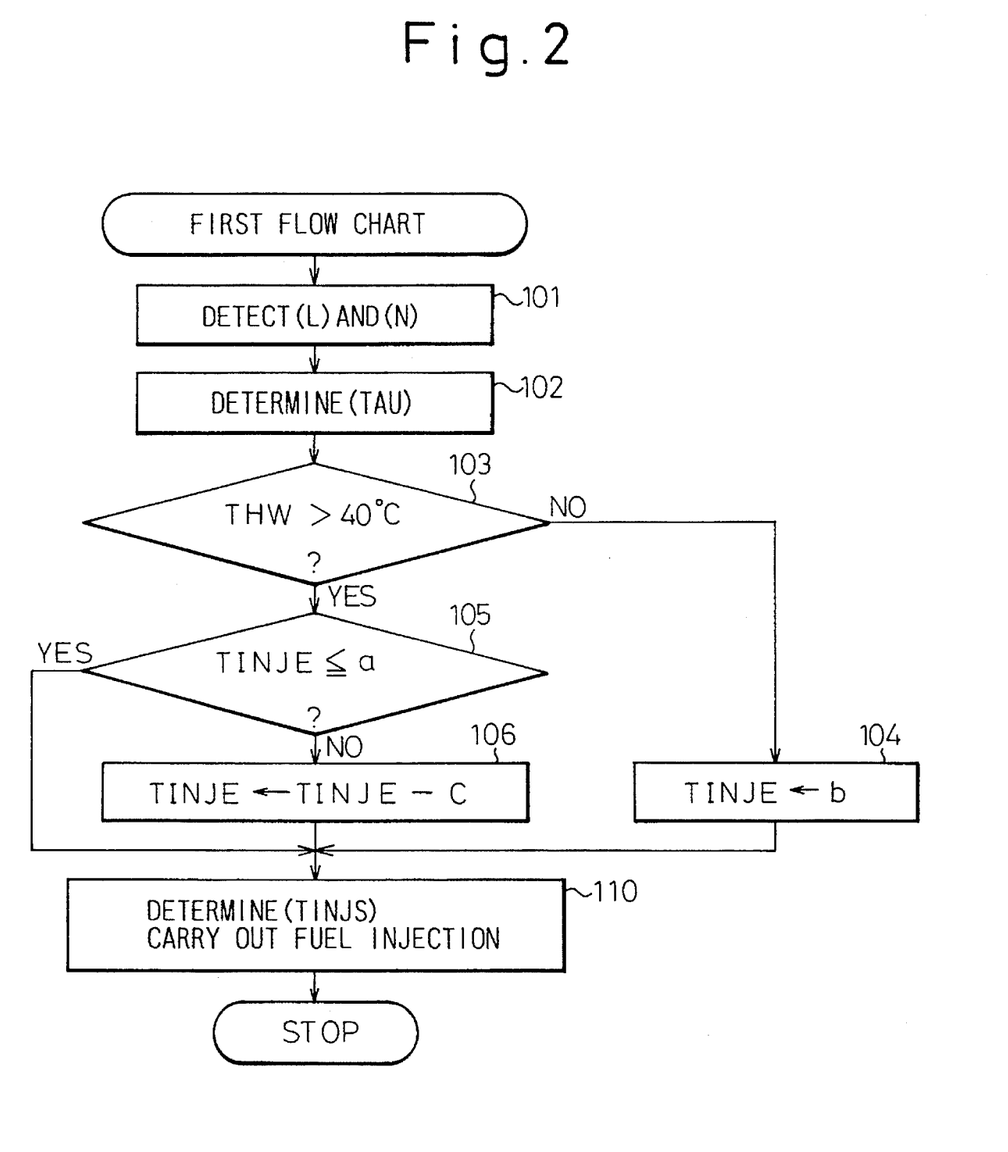
FIG. 2 is a first flowchart showing control of the fuel injection timing.

The ECU 20 controls the fuel injection timing of, and the amount of fuel injected from, the fuel injector 8 according to a process portrayed in the flowchart of FIG. 2. The process is carried out, for example, every predetermined period as follows.

Figure 3:
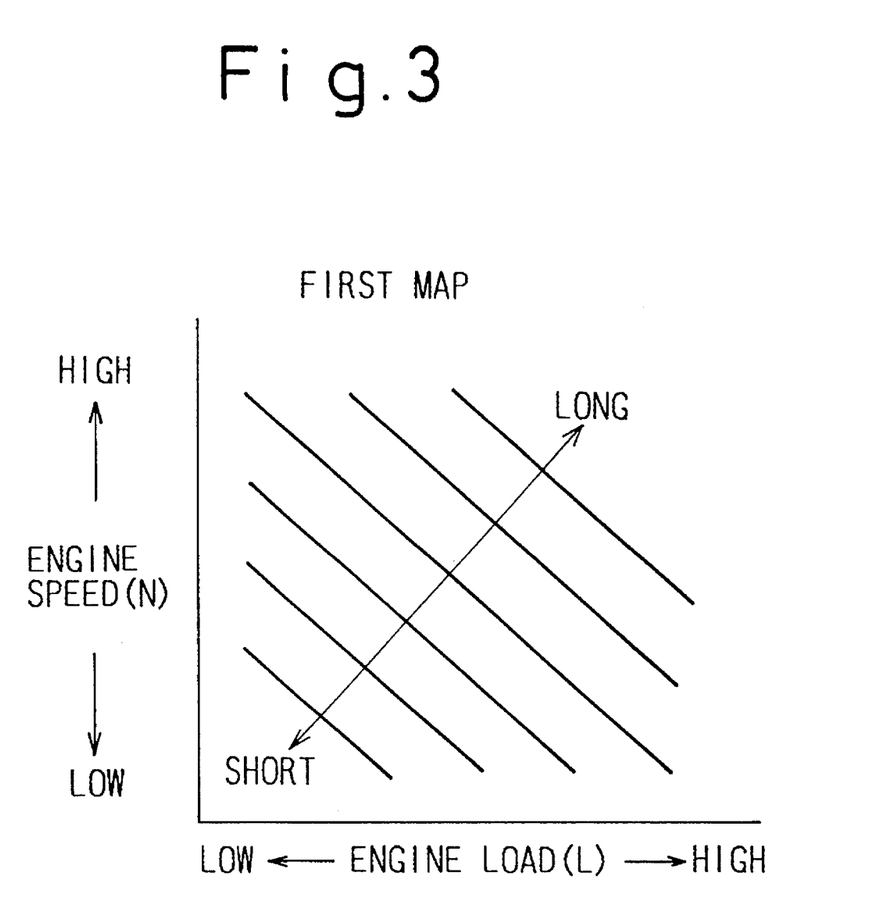
FIG. 3 is a first map used in the first, second, and third flowcharts.

At step 101, the current engine load (L) based on the stroke of the accelerator pedal 34, the stroke of the acceleration pedal 34 being considered the current engine load, is detected by the accelerator pedal sensor 33, and the current engine speed (N) is detected by the engine speed sensor 31. Next, at step 102, a required amount of fuel to be injected, i.e., the open period (TAU) of the fuel injector 8 is determined, using the first map shown in FIG. 3, on the basis of the current engine load (L) and the current engine speed (N).

Next, the routine goes to step 103 and the current temperature of the cooling water (THW), which is considered to be the engine temperature, is detected by the coolant temperature sensor 35. It is then determined whether the engine temperature (THW) is higher than 40 degrees C. When the result is NO, i.e., when the engine has not warmed up, the routine goes to step 104 and the fuel injection end-timing (TINJE) is set to a predetermined first crank angle (b) at the end of the intake stroke. Next, the process executes step 110 and the fuel injection start timing (TINJS) is calculated on the basis of the fuel injection end-timing (TINJE), the open period (TAU) of the fuel injector 8, and the current engine speed (N). Then the determined fuel injection is carried out.

When the engine has not warmed up, the temperature of the intake port 5 is so low that the fuel that sticks or adheres to the intake valve 4 can not vaporize sufficiently. However, most of the fuel injected during the intake stroke is atomized by the intake air and is supplied to the combustion chamber 1 with the intake air. Thus, the amount of fuel sticking to the intake valve 4 is very small and the required air-fuel ratio for proper combustion can be achieved.

On the other hand, once the engine has warmed up and the temperature of the cooling water (THW) has risen to more than 40 degrees C, the result at step 103 is YES and the process goes to step 105. At step 105, it is determined if the fuel injection end-timing (TINJE) is equal to or smaller than a predetermined second crank angle (a) immediately before the intake valve opens. When the engine first starts, the fuel injection end-timing (TINJE) is the first crank angle (b), as described above, which occurs at the end of the intake stroke, so that the result is NO and the routine goes to step 106. At step 106, the fuel injection end-timing (TINJE) is calculated by subtracting a predetermined small value (c) from the preceding fuel injection end-timing (TINJE).

Next, the routine goes to step 110 and the fuel injection start timing (TINJS) is calculated on the basis of the recalculated fuel injection end-timing (TINJE), the open period (TAU) of the fuel injector 8, and the current engine speed (N). Then the fuel injection is carried out commencing at the newly calculated start time. By repeating the process flow at the predetermined periods, the fuel injection end-timing (TINJE) gradually approaches, over time, the second crank angle (a) in steps by the amount of small value (c) each step. Once the fuel injection end-timing (TINJE) becomes equal to or less than the second crank angle (a), the result at step 105 is YES and the process goes to step 110 without carrying out the process at step 106. Thereafter, the fuel injection end-timing (TINJE) is held at the second crank angle (a), that is, the value at the time the fuel injection end-timing (TINJE) was determined to be less than or equal to the second crank angle (a), and the fuel injection is carried out.

Thus, once the fuel injection timing has been gradually advanced after the engine has warmed up, the amount of fuel injected before the intake valve opens is gradually increased at each fuel injection. As a result, the amount of fuel which remains stuck or adhered to the intake valve 4 increases, by a small amount, at each fuel injection. Accordingly, in the process with the fuel injection timing being gradually advanced, although a small amount of fuel is lost from the injected fuel by becoming stuck to the intake valve 4, the air-fuel ratio of the mixture does not become leaner such that the drivability of the vehicle deteriorates because the gradually increased, previously adhered fuel vaporizes to compensate for the lost fuel. On the other hand, during the fuel injection when the fuel injection end-timing (TINJE) becomes substantially the second crank angle (a) occurring immediately before the intake valve 4 opens, the amount of fuel which sticks or adheres to the intake valve 4 has already become a sufficient amount of fuel from which enough fuel vaporizes to compensate for the loss of fuel in the current injection cycle due to adherence or sticking of the injected fuel to the intake valve 4 that cannot vaporize. Accordingly, an adequate air-fuel mixture is in the current injection cycle formed by the fuel, which rebounds from the intake valve 4 and becomes droplets, and by the fuel which vaporizes from the intake valve 4. Thus, the air-fuel ratio of the mixture does not become very lean and driving performance does not deteriorate.

Figure 4:
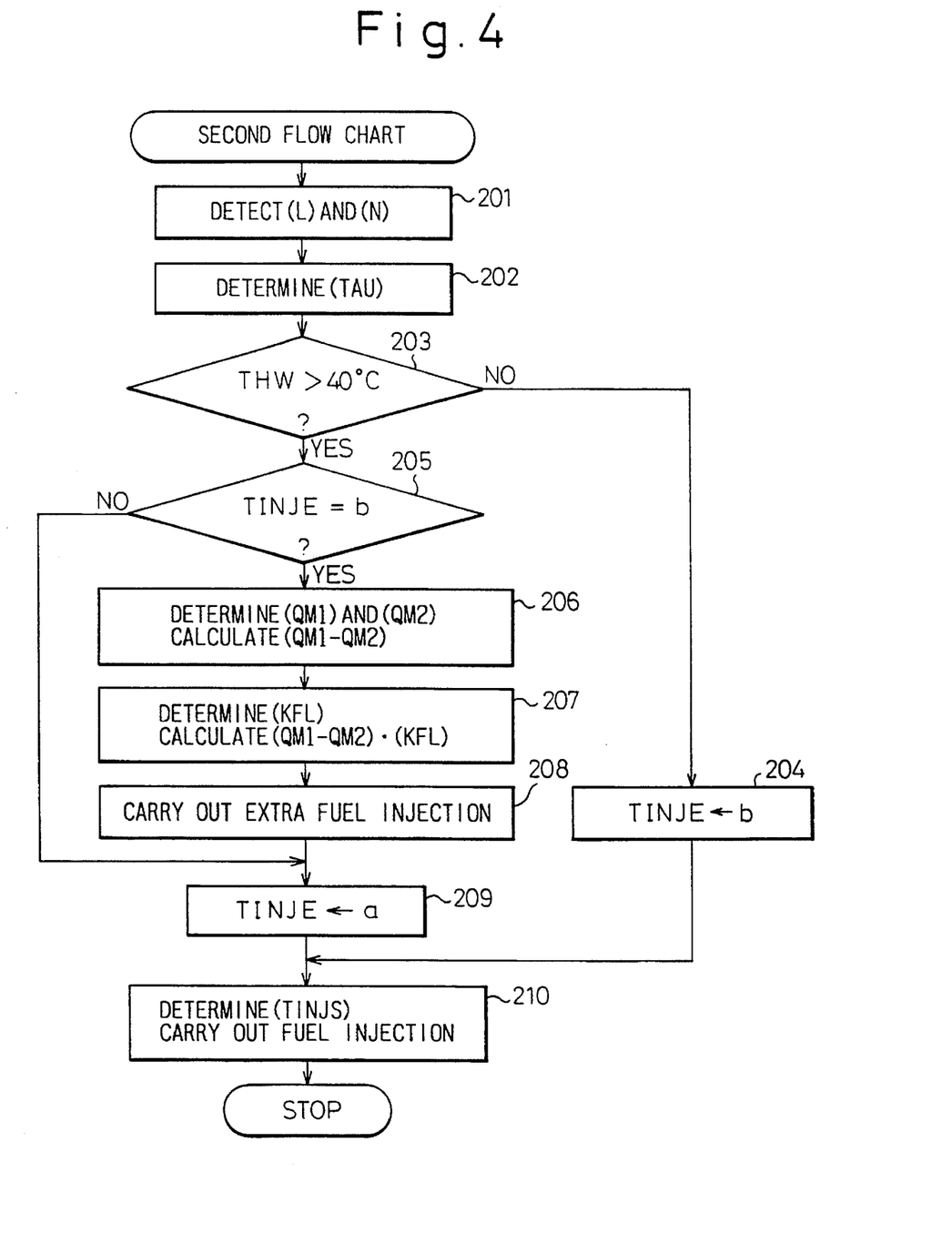
FIG. 4 is a second flowchart showing control of the fuel injection timing.

FIG. 4 shows a second process for controlling the fuel injection timing of, and the amount of fuel injected from, the fuel injector 8. The difference between the first and second processes is as follows.

Figure 5:
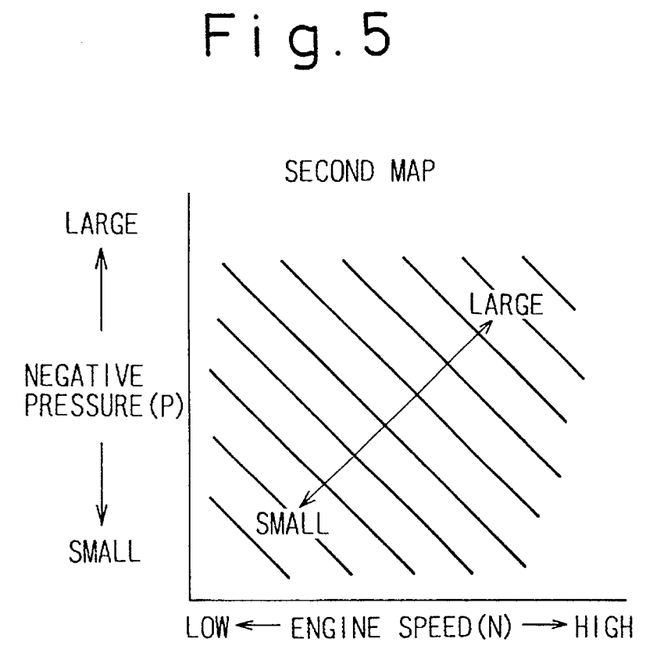
FIG. 5 is a second map used in the second flowchart.
Figure 6:
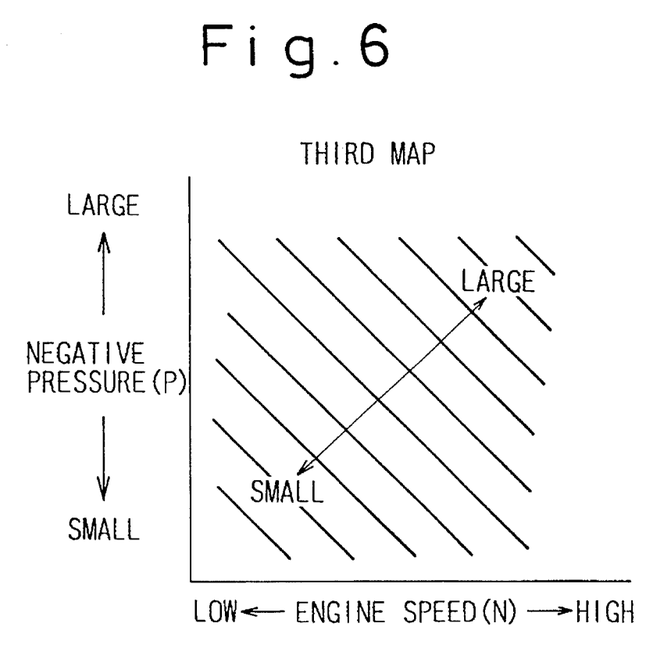
FIG. 6 is a third map used in the second flowchart.

In the second control process, once the temperature of the cooling water (THW) rises to more than 40° C., the result at step 203 is YES, the process goes to step 205. At step 205, it is determined if the fuel injection end-timing (TINJE) is the first crank angle (b). At first, the result is YES, because so long as the temperature was below 40° C., the fuel injection end-timing (TINJE) was set equal to b, and the routine goes to step 206. At step 206, a first amount of fuel (QM1) which would stick or adhere to the intake valve 4 that will result in enough fuel vaporizing at the next cycle to compensate for the loss of the fuel injected due to adherence to the intake valve 4 at that cycle, when the fuel injection end-timing (TINJE) is the second crank angle (a) immediately before the intake valve opens, is determined using a second map as shown in FIG. 5, on the basis of the current engine speed (N) and the current negative pressure (P) in the intake port 5 detected by the pressure sensor 32. On the other hand, a second amount of fuel (QM2) which sticks or adheres to the intake valve 4 when the fuel injection end-timing (TINJE) is the first crank angle (b) at the end of the intake stroke, as it is at this time, is determined from a third map as shown in FIG. 6, on the basis of the current engine speed (N) and the current negative pressure (P) in the intake port 4 detected by the pressure sensor 32. In the second and third maps, the first amount of fuel (QM1) and the second amount of fuel (QM2) are set such that the higher the engine speed is, and/or the larger the negative pressure (P) is, the larger the values (QM1), (QM2) become, respectively. Thereafter, the difference (QM1–QM2) between the first amount of fuel and the second amount of fuel is calculated.

Figure 7:
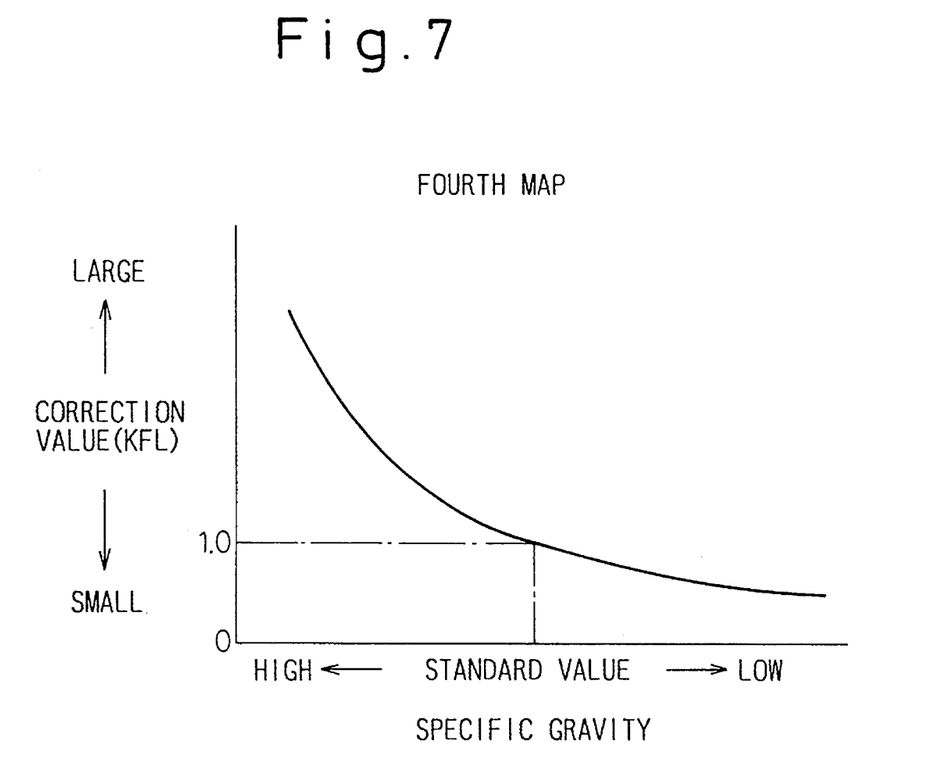
FIG. 7 is a fourth map used in the second flowchart.

Next, the process goes to step 207 where a correction value (KFL) is determined from a fourth map, as shown in FIG. 7, on the basis of a fuel property, for example, the specific gravity of the fuel. When the specific gravity of the fuel is high, the fuel easily sticks or adheres to the intake valve 4. On the other hand, when the specific gravity of the fuel is low, very little or no fuel sticks to the intake valve 4. The difference (QM1–QM2) is multiplied by the correction value (KFL). Next, the process goes to step 208 and the fuel injection amount calculated at step 207 is injected as an extra fuel injection before the fuel injection at step 210.

Next, the process goes to step 209 and the fuel injection end-timing (TINJE) is made equal to the second crank angle (a). The routine goes to step 210 and the fuel injection start timing (TINJS) is determined, on the basis of the fuel injection end-timing (TINJE), the current engine speed (N), and the open period (TAU) of the fuel injector 8, and the fuel injection operation is carried out.

When the process is next executed, the fuel injection end-timing (TINJE) is already the second crank angle (a) so that the result at step 205 is NO and the routine goes to step 209. Accordingly, the process at step 208 is carried out only when the fuel injection end-timing is changed from during the intake stroke to before the intake stroke as a transition procedure.

Thus, once the extra fuel injection is carried out when the fuel injection end-timing is changed from during the intake stroke to before the intake stroke, an appropriate amount of fuel to compensate for the injected fuel that has stuck to the intake valve 4 vaporizes from the fuel provided by the extra fuel injection and stuck to the intake valve 4 to provide sufficient fuel so that the desired air-fuel ratio is realized during the initial fuel injection before the intake stroke.

In the second process, the correction value (KFL) may also be determined on the basis of the difference between the actual fuel injection amount and the fuel amount actually supplied into the combustion chamber 1, the latter being determined from the actual air-fuel ratio detected by the air-fuel ratio sensor 36.

Figure 8:
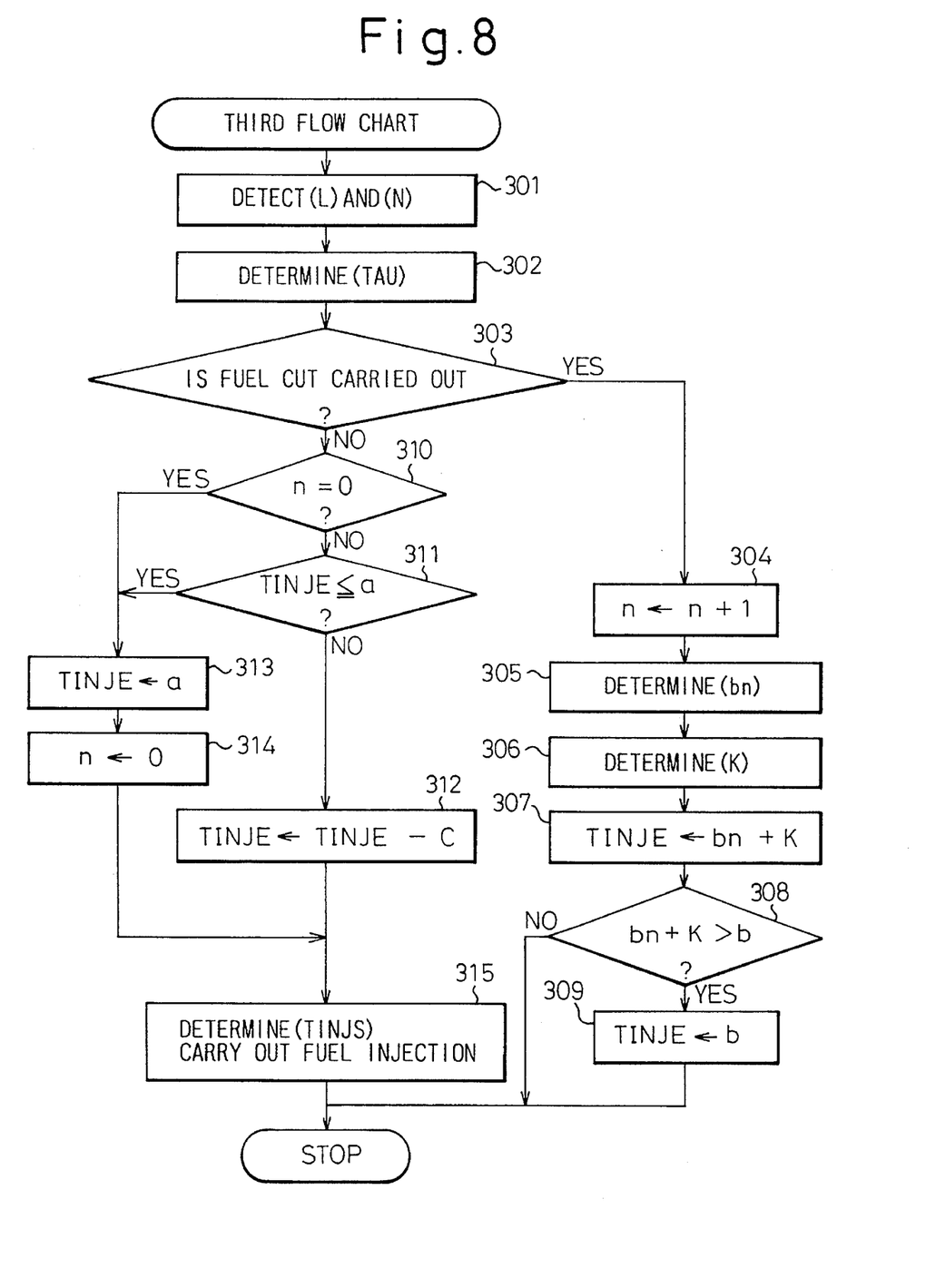
FIG. 8 is a third flowchart showing control of the fuel injection timing.

FIG. 8 shows a third process for controlling the fuel injection timing of, and the amount of fuel injected from, the fuel injector 8. The third process is for an engine which carries out a fuel cut operation, i.e., the stopping of the flow of the fuel, during deceleration and the like, to save fuel.

First, at step 301, the current engine load (L), based on the stroke of the accelerator pedal 34, is detected by the accelerator pedal sensor 33 and the current engine speed (N) is detected by the engine speed sensor 31. Next, at step 302, the required amount of fuel to be injected, i.e., the opening period (TAU) of the fuel injector 8 is determined, from the first map shown in FIG. 3, on the basis of the current engine load (L) and the current engine speed (N).

Next, the process goes to step 303 and it is determined if the fuel cut operation is being carried out, for example, on the basis of a variation in the stroke of the accelerator pedal 34. When the result is YES, the routine goes to step 304 and a count value (n) is increased by "1".

Figure 9:
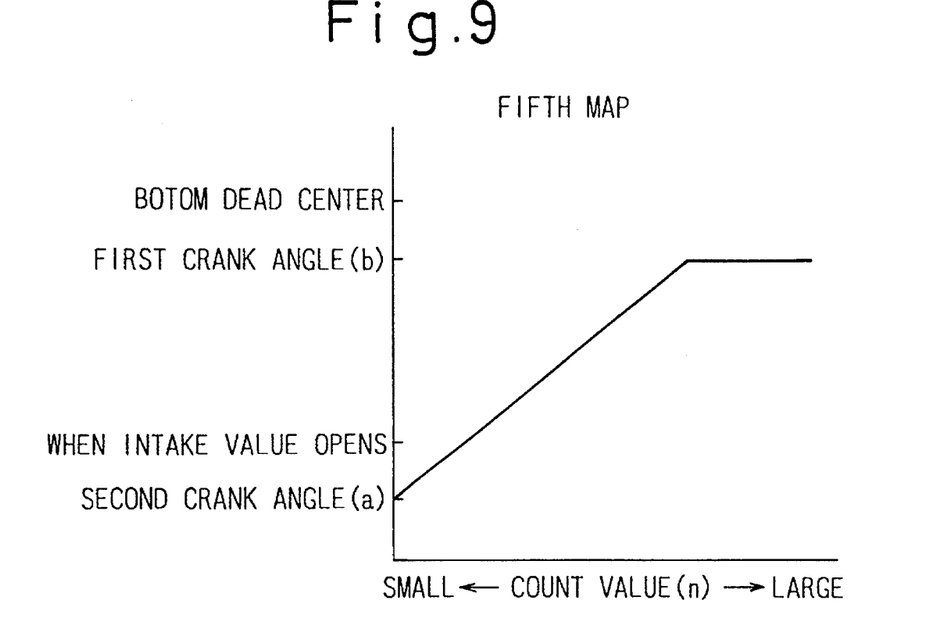
FIG. 9 is a fifth map used in the third flowchart.
Figure 10:
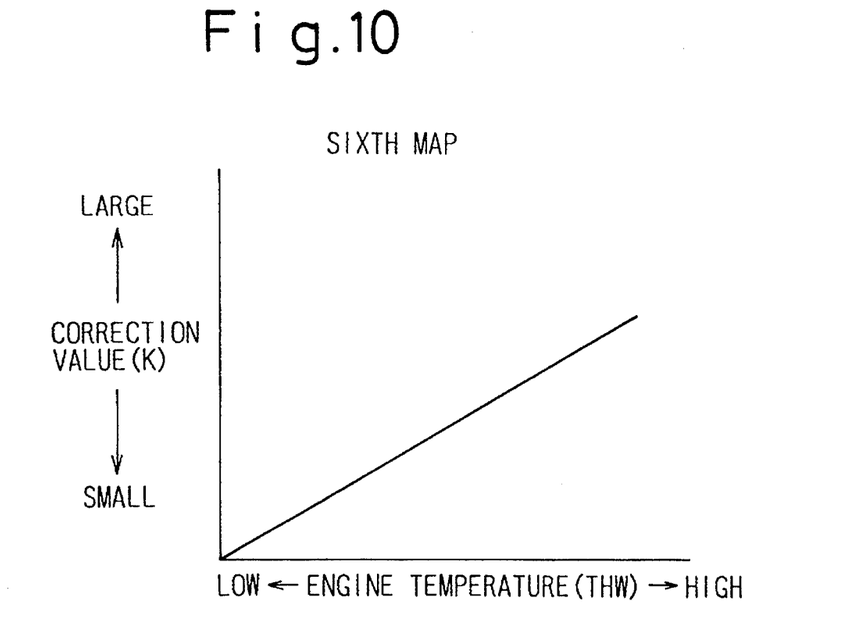
FIG. 10 is a sixth map used in the third flowchart.

Next, the routine goes to step 305 and a crank angle (bn) is determined from a fifth map, shown in FIG. 9, on the basis of the current count value (n). In the fifth map, the crank angle (bn) is set such that the value becomes the first crank angle (b) when the count value (n) is larger than a predetermined value, and the value becomes the second crank angle (a) when the count value (n) is "0". The smaller the count value (n), the smaller the crank angle (bn). Next, the process goes to step 306 and a correction value (K) is determined from a sixth map, shown in FIG. 10, on the basis of the current engine temperature (THW). In the sixth map, the correction value (K) is set such that the higher the engine temperature, the larger the correction value K. In step 307 the fuel injection end-timing (TINJE) is made equal to the crank angle (bn+K). Next, the process goes to step 308 and determines if the crank angle (bn+K) is larger than the first crank angle (b). When the result is YES does the routine go to step 309 and the fuel injection end-timing (TINJE) is made to equal the first crank angle (b). Next, the routine ends without any fuel injection occurring because the fuel cut is being carried out. This flow is repeated until the fuel cut is stopped and the count value (n) continues to increase to correspond to the period of the fuel cut.

When the fuel cut is stopped, the result at step 303 is NO and the process goes to step 310 where it is determined whether the count value (n) is "0". Immediately after the fuel cut is stopped, the result at step 310 will be NO and the process will go to step 311. At step 311, it is determined if the fuel injection end-timing (TINJE) is equal to or less than the second crank angle (a) immediately before the intake valve opens. At first, the result is NO and the process goes to step 312. At step 312, a new fuel injection end-timing (TINJE) is calculated by subtracting a predetermined value (c) from the current fuel injection end-timing (TINJE) and the process goes to step 315. At step 315, the fuel injection start timing (TINJS) is calculated on the basis of the new fuel injection end-timing (TINJE), the open period (TAU) of the fuel injector 8 and the current engine speed (N). Fuel injection is then carried out.

As the process flow is periodically repeated, the fuel injection end-timing (TINJE) is gradually advanced and eventually reaches the second crank angle (a). Whereby, the result at step 311 is YES. The process then goes to step 313 and the fuel injection end-timing (TINJE) is set to the second crank angle (a). In step 314 the count value (n) is reset to "0". Thereafter, at step 315, the fuel injection is carried out. Thus, the fuel injection end-timing (TINJE) is held at the second crank angle (a) until the fuel cut starts again and the result at step 303 is YES.

Immediately after the fuel cut starts, a certain amount of fuel is stuck or adhered to the intake valve 4 due to the prior fuel injections. The adhered fuel gradually vaporizes at each intake stroke and is supplied to the combustion chamber 1 so that the amount of fuel adhered to the intake valve 4 is reduced as a fuel cut is in effect. Accordingly, if the fuel injection before the intake stroke starts immediately after the fuel cut is finished, the air-fuel ratio of the mixture becomes very lean and the drivability of the vehicle deteriorates. However, according to the third process, the fuel injection during the intake stroke starts immediately after the fuel cut finishes and thereafter the fuel injection end-timing is gradually advanced so that a desired air-fuel ratio can be provided.

Moreover, according to the third process, the shorter the fuel cut period, the closer the fuel injection end-timing immediately after the fuel cut finishes remains to the second crank angle (a). Thus, when the fuel cut period is relatively short, the fuel injection end-timing immediately after the fuel cut finishes is set to a crank angle that is still relatively close to the second crank angle (a) so that the amount of fuel injected before the intake valve 4 opens becomes large but the amount of fuel which adheres to the intake valve 4 is small because a large amount of fuel is already adhered to the intake valve 4. Thus, a desired air-fuel ratio of the mixture can be provided. In addition, the higher the engine temperature is, the more easily does the adhered fuel vaporize so that the fuel injection end-timing immediately after the fuel cut finishes is adjusted to account for the current engine temperature. Accordingly, the fuel injection before the intake stroke, by which a good air-fuel mixture can be supplied into the combustion chamber 1, can be carried out soon after the fuel cut finishes.

Although the invention has been described with reference to specific processes or embodiments thereof, it should be apparent that numerous modifications can be made thereto by those skilled in the art, without departing from the basic concept and scope of the invention.

We claim:

1. A fuel injection timing control system for an internal combustion engine, comprising:

a fuel injector for injecting fuel into an intake port; and a controller for controlling a fuel injection end-timing such that said end-timing is varied gradually from occurring at a time of a first crank angle which occurs during an intake stroke, to occurring at a time of a second crank angle which occurs before said intake stroke, in accordance with a current engine operating condition.

2. The fuel injection timing control system according to claim 1, wherein said controller controls the fuel injection end-timing of said fuel injector so as to gradually change said fuel injection end-timing from said time of said first crank angle occurring during said intake stroke to said time of occurrence of said second crank angle occurring before said intake stroke commencing immediately after said engine has warmed up.

3. The fuel injection timing control system according to claim 1, wherein said controller controls said fuel injection end-timing of said fuel injector so as to gradually change said fuel injection end-timing from said time of said first crank angle occurring during said intake stroke to said time of occurrence of said second crank angle that occurs before said intake stroke commencing immediately after a period of cutting of fuel feed finishes.

4. The fuel injection timing control system according to claim 3, wherein said controller changes said second crank angle such that the shorter said period of cutting fuel is, the earlier said time of occurrence of said second crank angle becomes.

5. The fuel injection timing control system according to claim 3, wherein said controller controls said second crank angle such that the lower an engine temperature is, the earlier said time of occurrence of said second crank angle becomes.

6. The fuel injection timing control system for an internal combustion engine, comprising:

a fuel injector for injecting fuel into an intake port;

a controller for changing an injection end-timing of said fuel injector from during an intake stroke to before said intake stroke according to an engine operating condition, wherein said controller increases an amount of fuel injected by said fuel injector to take account of an amount of fuel which sticks to a surface of said intake port under varying engine operating conditions.

7. The fuel injection timing control system according to claim 6, wherein said controller changes said injection end-timing from during said intake stroke to before said intake stroke immediately after said engine has warmed up.

8. The fuel injection timing control system according to claim 6, wherein said controller increases said amount of fuel on a basis of a difference between a first amount of fuel which sticks to said intake port and which is required in fuel injection before said intake stroke and a second amount of fuel which sticks to said intake port in fuel injection during said intake stroke.

9. The fuel injection timing control system according to claim 8, wherein said controller further determines said first amount and said second amount of fuel on a basis of a current negative pressure in said intake port and a current engine speed.

10. The fuel injection timing control system according to claim 8, wherein said controller changes said difference between said first and second amounts of fuel to take account of current fuel properties.

11. The fuel injection timing control system according to claim 10, wherein said controller changes said difference such that the higher a specific gravity of said fuel is, the larger said difference becomes.

12. The fuel injection timing control system according to claim 6, wherein said controller controls injection of said increasing amount of fuel as an extra fuel injection before said fuel injection occurring before said intake stroke.

* * * * *